United States Patent [19]

Yamaguchi et al.

[11] Patent Number: 5,051,897
[45] Date of Patent: Sep. 24, 1991

[54] SINGLE-CHIP MICROCOMPUTER WITH MEMORY PATCHING CAPABILITY

[75] Inventors: Masafumi Yamaguchi; Kazuo Hayashi; Junji Kuroki, all of Hyogo, Japan

[73] Assignee: Mitsubishi Denki Kabushiki Kaisha, Tokyo, Japan

[21] Appl. No.: 288,504

[22] Filed: Dec. 22, 1988

[30] Foreign Application Priority Data

Mar. 11, 1988 [JP] Japan ................... 63-58572

[51] Int. Cl.$^5$ .................. G06F 9/06; G06F 12/00; G11C 17/10
[52] U.S. Cl. .................. 364/200; 364/245.3; 371/40.1; 371/10.1; 371/10.2
[58] Field of Search .................. 364/200, 900; 340/825.24; 371/40.1, 40.3, 10.1, 10.2, 12, 19, 21.1, 21.6

[56] References Cited

U.S. PATENT DOCUMENTS

| 3,665,426 | 5/1972 | Gross et al. | 364/200 |
| 3,934,227 | 1/1976 | Worst | 364/200 |
| 4,486,750 | 12/1984 | Aoki | 340/825 |
| 4,580,212 | 3/1986 | Hosaka | 364/200 |
| 4,636,945 | 1/1987 | Tanagawa et al. | 364/200 |
| 4,713,812 | 12/1987 | Arnold et al. | 371/10.1 |
| 4,783,781 | 11/1988 | Awaya | 371/10.2 |
| 4,802,119 | 1/1989 | Heene et al. | 364/900 |
| 4,811,219 | 3/1989 | Touji et al. | 364/405 |

FOREIGN PATENT DOCUMENTS

| 0179949 | 4/1986 | European Pat. Off. . |
| 3137152 | 4/1983 | Fed. Rep. of Germany . |
| 60-145596 | 8/1985 | Japan . |
| 61-210600 | 9/1986 | Japan . |
| 62-52635 | 3/1987 | Japan . |

Primary Examiner—Allen R. MacDonald
Assistant Examiner—Glenn A. Auve
Attorney, Agent, or Firm—Townsend and Townsend

[57] ABSTRACT

A single-chip microcomputer is disclosed, which comprises a central processing unit including a programmable counter for storing address data for accessing a first memory and performing operations and control, a register for setting address data of a second memory and a coincidence circuit. When the contents of the register and programmable counter coincide, the coincidence circuit provides an instruction to the central processing unit. Thus, the central processing unit accesses an address of the second memory in lieu of an address of the first memory, in which an undesired instruction in stored, according to data in the first memory. Subsequently, the second memory address is accessed in lieu of the first memory address with the undesired instruction therein.

4 Claims, 4 Drawing Sheets

F I G. 2
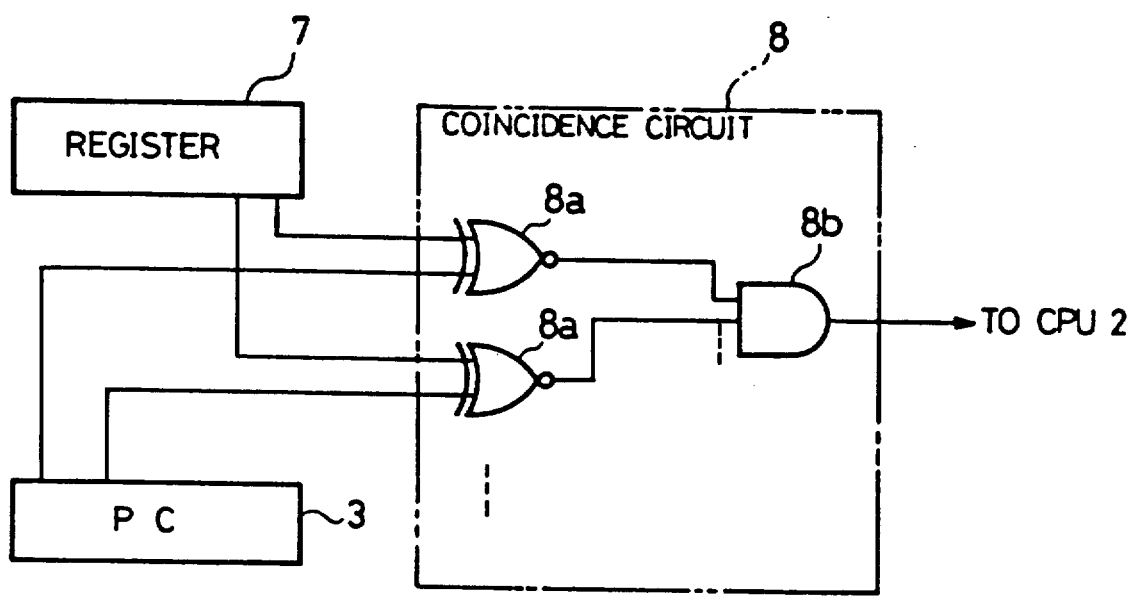

SINGLE-CHIP MICROCOMPUTER WITH MEMORY PATCHING CAPABILITY

BACKGROUND OF THE INVENTION

1. Field of the Invention

This invention relates to a single-chip microcomputer having a mask read-only memory (ROM) in which instructions or like programs are set in a manufacturing process and particularly to a single-chip microcomputer which has a function of avoiding errors in such programs.

2. Description of the Prior Art

FIG. 4 is a block diagram showing the internal configuration of a prior art single-chip microcomputer. In the Figure, reference numeral 1 designates a mask ROM, in which necessary instructions or the like programs for data processing are stored, 2 a central processing unit (CPU) having a programable counter (PC) 3 for storing address data accessing the mask ROM 1 and performing operations and control, 4 an address bus, through which address signals flow, and 5 a data bus, through which data signals flow.

This prior art microcomputer operates as follows. The instructions or programs in the mask ROM 1 are set in a process of integrated circuit manufacture. The PC 3 in the CPU 2 accesses a given address of the mask ROM 1, and the CPU 2 takes in a corresponding instruction in the mask ROM 1 and performs operations and control according to this instruction. Subsequently, the PC 3 accesses another address of the mask ROM 1, in which the next instruction is stored, and performs again similar operations.

The process of manufacturing the mask ROM consists of, for instance, a field formation step, a gate formation step, a depletion step, a source/drain formation step, a contact formation step and an aluminum step. Programs or the like data are set in the depletion step.

In the prior art single-chip microcomputer with the mask ROM manufactured in the above process, if it is found after the manufacture that instructions in some of the addresses of the mask ROM are inconvenient in use, that is, if it becomes necessary to correct programs, it is necessary to set instructions or programs in the mask ROM afresh by producing the microcomputer afresh.

SUMMARY OF THE INVENTION

This invention has been intended in order to solve the above problems, and its object is to provide a single-chip microcomputer, which permits alteration of instructions or programs without producing it afresh when it becomes necessary to correct instructions or programs in the mask ROM after its manufacture.

According to the invention, there is provided a single-chip microcomputer comprising:

a first memory (mask ROM 1), in which data necessary for data processing are set in a process of integrated circuit manufacture;

a central processing unit 2 including a programmable counter 3 for storing address data accessing the first memory and performing operations and control;

a second memory (PROM 6) capable of electrically re-writing data;

a register 7 for setting address data of the second memory in lieu of address data of the first memory according to re-writing data in the first memory; and a coincidence circuit for providing an interruption to the central processing unit 2 upon detection of a coincidence of the contents of the register 7 and the programmable counter 3;

the central processing unit 2 functioning to access an address of the second memory as the designation of the interruption upon provision thereof.

The above and other objects, features and advantages of the invention will become more apparent from the following description when taken in conjunction with the accompanying drawings.

BRIEF DESCRIPTION OF THE DRAWINGS

FIG. 2 is block diagram for explaining a configuration of the coincident circuit shown in FIG. 1;

DESCRIPTION OF THE PREFERRED EMBODIMENT

Figure 1:
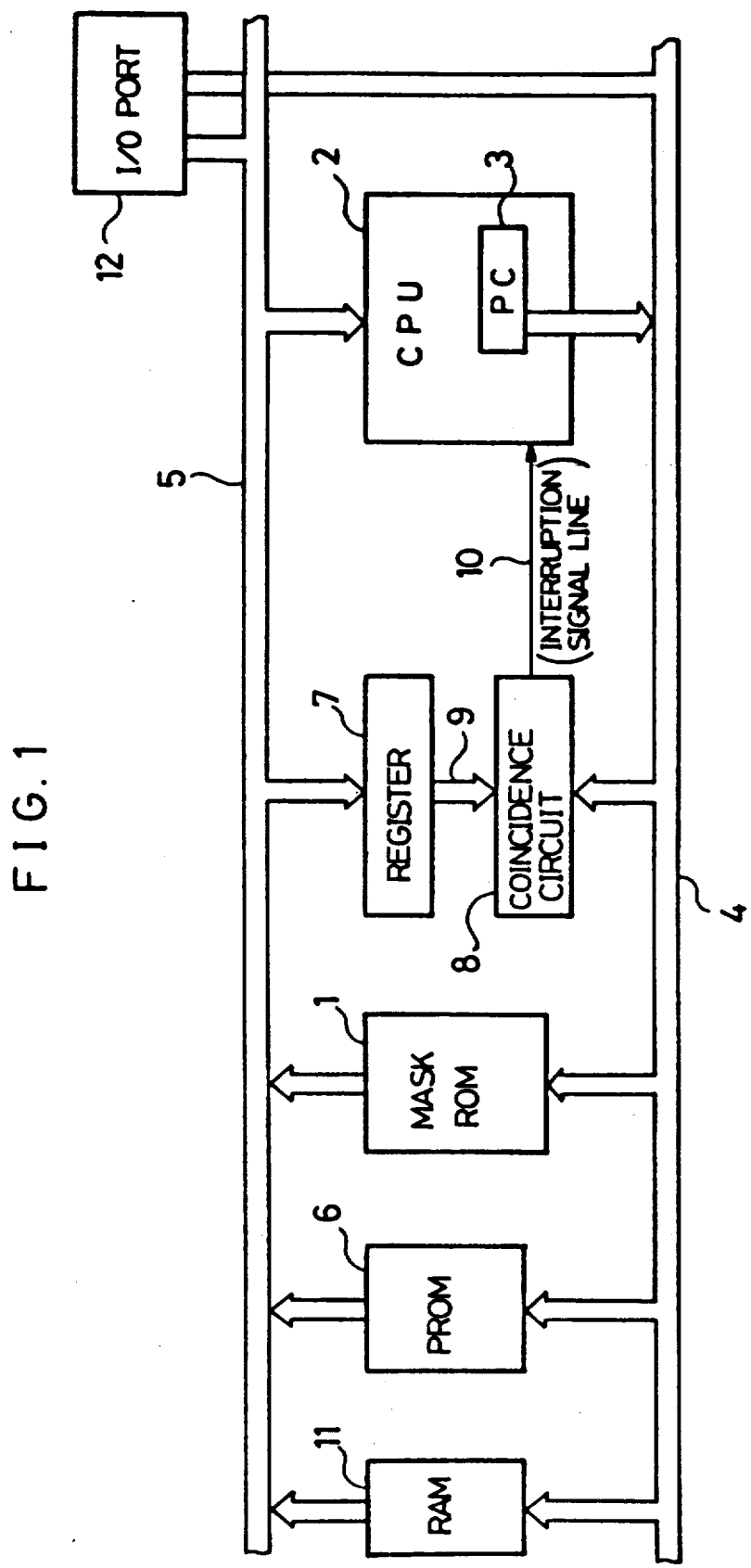
FIG. 1 is a block diagram showing the essential configuration of an embodiment of a single-chip microcomputer according to the invention.

FIG. 1 is a block diagram showing the internal configuration of an embodiment of a single-chip microcomputer according to the invention. In the Figure, reference numeral 1 designates a mask ROM (or first memory), in which instructions or programs necessary for data processing, particularly, data including initial program (re-writing data) for reading an address in a PROM and setting the read-out address in a register, are set in a process of manufacturing an integrated circuit, 2 a CPU having a PC 3 for storing address data accessing the mask ROM 1 and effecting operations and control, 4 an address bus, through which address signals flow, 5 a data bus, through which data signals flow, 6 a programmable ROM (PROM) (or second memory) capable of electrically re-writing stored data after the manufacture of the microcomputer, 7 a register for setting address data for the PROM 6 in lieu of address data of the mask ROM 1 according to re-writing data in the mask ROM 1, 8 a coincidence circuit for providing an interruption to the CPU 2 when it detects a coincidence of the contents of the register 7 and the PC 3, 9 a signal line for transmitting contents of the register 7 to the coincidence circuit 8, 10 an interruption signal line for transmitting data as to whether there is an interruption from the coincidence circuit 8 to the CPU 2, 11 a random access memory (RAM) for storing data necessary for data processing, and 12 an input/output (I/O) port, through which data are input and output.

FIG. 2 is a block diagram for explaining the configuration of the coincidence circuit shown in FIG. 1. Referring to FIG. 2, the coincidence circuit 8 includes a plurality of exclusive NOR (EX NOR) gates 8a for exclusively NORing the outputs of the register 7 and the PC 3 and an AND gate 8b for ANDing the outputs of the EX NOR gates 8a.

Figure 3:
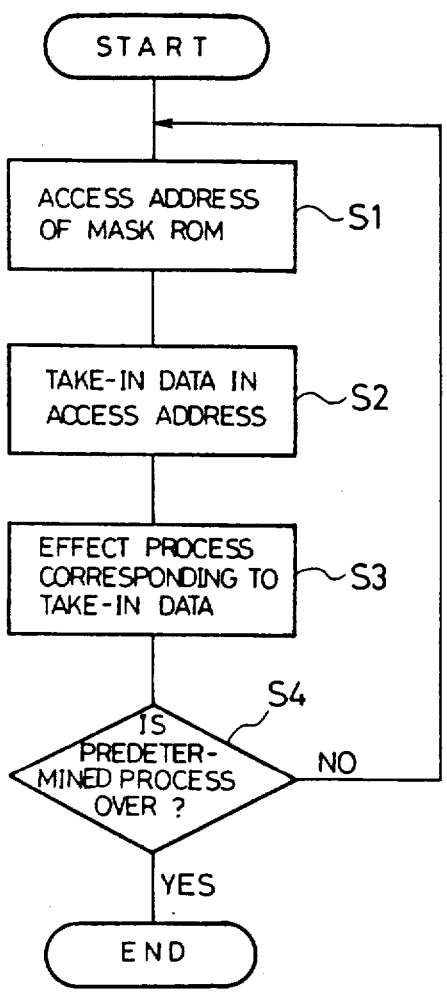
FIGS. 3(a) and 3(b) are flow charts for explaining the operation of the embodiment.
Figure 3:
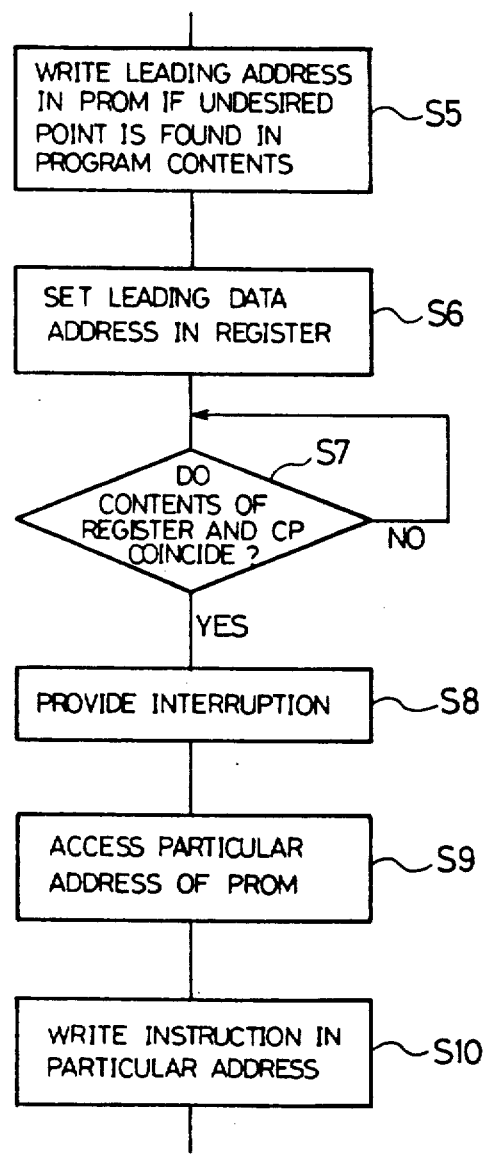
Figure 4:
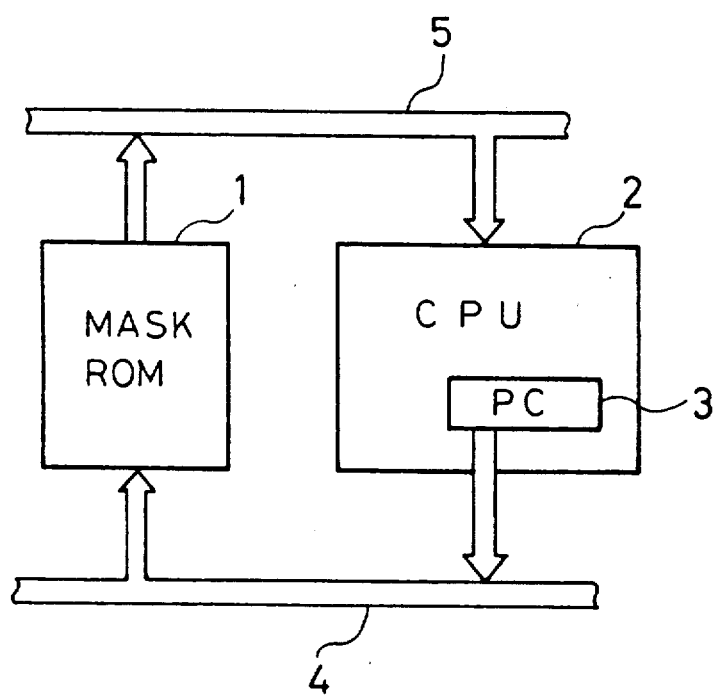
FIG. 4 is a block diagram showing the essential configuration of a prior art single-chip microcomputer.

The operation of this embodiment will now be described with reference to the flow charts shown in FIGS. 3(a) and 3(b). The PC 3 in the CPU 2 accesses an address of the mask ROM 1 via the address bus 4 (STEP S1). The CPU 2 takes in data in the corresponding address of the mask ROM 1 via the data bus 5 (STEP S2), and performs a process in correspondence with the taken-in data (STEP S3). Subsequently, the PC 3 accesses another address of the mask ROM 1, in which the next instruction is stored. The above sequence of operations (STEPS S1 through S4) are repeated until predetermined processings are ended.

In this embodiment, for a leading portion of each program in the mask ROM 1 contents of a predetermined address of the PROM 6 are set in the register 7 through the data bus 5. However, address data which are not used during program execution are set in advance in predetermined addresses of the PROM 6 in order that no interruption is provided to the CPU 2 in the initialization state. If undesired contents are found in the program set in the mask ROM 1, the leading address of that program is written in the PROM 6 (STEP S5) to be set in the register 7 via the data bus 5 (STEP S6). Thus, if the PC 3 is going to access an undesired address in the mask ROM 1 during the program execution, the coincidence circuit 8 detects a coincidence of the contents of the register 7 and the PC 3 (STEP S7) and provides an interruption to the CPU 2 via the inerruption signal line 10 (STEP S8). Thus, the PC 3 takes in the interruption signal and accesses a particular address of the PROM 6 that is set by that interruption signal (STEP S9). A corrected instruction thus is written in a particular address of the PROM 6 as the destination of the interruption via the I/O port 12 (STEP S10), so that the microcomputer executes the corrected program.

In the above embodiment, the coincidence circuit 8 consists of the EX NOR gates 8a and the AND gate 8b. However, it is possible to construct a coincidence circuit consisting of EX OR gates and a NOR gate.

As has been described in the foregoing, according to the invention there are provided a register for setting address data of a second memory in lieu of address data of a first memory according to re-write data in the first memory and, a coincidence circuit for providing an interruption to a CPU upon detection of a coincidence of the contents of the register and a PC. Thus, it is possible to permit accessing of a given address of the second memory in lieu of accessing of an address of the first memory in which an undesired instruction is stored. Thus, when it becomes necessary to correct a program or the like in the first memory (i.e., mask ROM) after the manufacture of a microcomputer, alteration of instructions or programs can be effected without need of producing the microcomputer afresh. Thus, it is possible to simplify the circuit configuration and reduce size and price of the microcomputer.

What is claimed is:

1. A single-chip microcomputer comprising:
    a data bus and an address bus;
    a first memory, connected to said data bus and said address bus, in which data necessary for data processing are set in a process of integrated circuit manufacture;
    a central processing unit, connected to said data bus and said address bus, for performing operations and control;
    a programmable counter, as part of said central processing unit, having an output connected to said address bus, for generating address data for accessing said first memory;
    a second memory, connected to said data bus and said address bus, capable of being electrically rewritten;
    a register with an input and an output, with said register input connected to said data bus, for setting a plurality of address data of said second memory in lieu of a plurality of address data of said first memory; and
    a coincidence circuit with a first input connected to said register output, a second input connected to said address bus, and an output connected to said central processing unit, for providing an interruption to said central processing unit upon detection of a coincidence between said register output and said programmable counter output;
    an I/O port, coupled to said address bus and to said data bus, for inputting data to be re-written to said second memory; and
    said central processing unit functioning to access an address of said second memory as a destination of said interruption upon provision thereof.

2. The single-chip microcomputer according to claim 1, wherein said coincidence circuit includes EXCLUSIVE OR gates for performing an exclusive or function between said register output and said programmable counter output, or EXCLUSIVE NOR gates for performing an exclusive nor function between said register output and said programmable counter output.

3. The single-chip microcomputer according to claim 1, wherein said first memory is a mask read-only memory.

4. The single-chip microcomputer according to claim 1, wherein said second memory is a programmable read-only memory.

* * * * *